United States Patent
Loriot et al.

(10) Patent No.: US 9,692,781 B2
(45) Date of Patent: Jun. 27, 2017

(54) DETECTING UNWANTED INTRUSIONS INTO AN INFORMATION NETWORK

(71) Applicant: CASSIDIAN CYBERSECURITY SAS, Elancourt (FR)

(72) Inventors: Nicolas Loriot, Rambouillet (FR); Ivan Fontarensky, Rambouillet (FR)

(73) Assignee: CASSIDIAN CYBERSECURITY SAS, Elancourt (FR)

(*) Notice: Subject to any disclaimer, the term of this patent is extended or adjusted under 35 U.S.C. 154(b) by 17 days.

(21) Appl. No.: 14/472,114

(22) Filed: Aug. 28, 2014

(65) Prior Publication Data

US 2015/0067858 A1 Mar. 5, 2015

(30) Foreign Application Priority Data

Aug. 28, 2013 (FR) .................................... 13 01993

(51) Int. Cl.
*G06F 21/00* (2013.01)
*H04L 29/06* (2006.01)
*G06F 17/30* (2006.01)

(52) U.S. Cl.
CPC .... *H04L 63/1441* (2013.01); *G06F 17/30864* (2013.01); *H04L 63/145* (2013.01); *H04L 63/1433* (2013.01); *H04L 63/0227* (2013.01); *H04L 2463/146* (2013.01)

(58) Field of Classification Search
CPC ..... H04L 63/1416; H04L 63/14; H04L 43/04; G06F 21/50
See application file for complete search history.

(56) References Cited

U.S. PATENT DOCUMENTS

| | | |
|---|---|---|
| 2007/0208822 A1 | 9/2007 | Wang et al. |
| 2008/0077995 A1 | 3/2008 | Curnyn |
| 2008/0126493 A1 | 5/2008 | Morrey |
| 2008/0222177 A1 | 9/2008 | Ramer |
| 2013/0318038 A1* | 11/2013 | Shiffer ................... G06F 17/30 707/610 |

* cited by examiner

*Primary Examiner* — Izunna Okeke
(74) *Attorney, Agent, or Firm* — Steven M. Greenberg, Esq.; CRGO Law

(57) ABSTRACT

The present invention relates to a device for detecting unwanted intrusions into an information network comprising a module for receiving raw data from the network, a plurality of search engines configured to detect an attack indicator and any derived data which may be corrupted, a distribution module suitable for allocating at least one search engine to each piece of raw data, an administrator module linked to the search engines and to the distribution module and configured to transmit each piece of derived data to said module as new raw data if it has not already been processed by said same search engine(s), so as to provide recursive analysis of each piece of raw data received by said receiving module. The invention further relates to a process implemented by a device of this type.

9 Claims, 4 Drawing Sheets

DETECTING UNWANTED INTRUSIONS INTO AN INFORMATION NETWORK

CROSS REFERENCE TO RELATED APPLICATIONS

This application claims priority under 35 U.S.C. §119(a) to French Patent Application Serial Number 1301993, filed Aug. 28, 2013, entitled "PROCESS FOR DETECTING UNWANTED INTRUSIONS INTO AN INFORMATION NETWORK, AND, CORRESPONDING DEVICE, COMPUTER PROGRAM PRODUCT AND STORAGE MEDIUM", the entire teachings of which are incorporated herein by reference.

BACKGROUND OF THE INVENTION

Field of the Invention

The technical field of the invention is that of processes and systems for detecting unwanted intrusions into an information network, in particular a computer network. In particular, the invention relates to methods for detecting targeted attacks of the "advanced persistent threat" type, also known by the acronym APT.

Description of the Related Art

Throughout the following text, the terms "targeted attack" and "unwanted intrusion" are used to define the same practice, which involves accessing an information network without authorisation from the manager thereof.

Throughout the text, the term "information network" refers to an information exchange network using any type of means of communication, such as an Ethernet network, a radio network etc. An information network of this type is for example a computer network, a radio network, a professional mobile radio network (also known by the acronym PMR), and in general a network interconnecting a set of appliances to exchange information. An information network refers both to a set of machines interconnected to exchange information and to an individual machine. In other words, a process for detecting unwanted intrusions into an information network according to the invention, in particular a computer network, aims both to detect intrusions on a network formed of a plurality of interconnected machines and to detect intrusions on a single machine which receives information, either via an Internet, Ethernet or radio network or the like or by connecting an information storage device such as a USB stick, a storage disc, a radio antenna etc.

Targeted attacks are a major threat to all organisations, whether they are public services, private businesses or government organisations. A targeted attack or unwanted intrusion of this type generally aims either to collect sensitive information of any type (trade secrets, sensitive political information, bank details etc.) or to take total control of the information network, in particular the computer network, of an organisation. It is often a silent attack which is spread out over time, and of which it is sometimes difficult to measure all of the consequences. These attacks originate from coordinated, organised, well-funded groups of individuals, which target high-value assets. The main difficulty in detecting these targeted attacks is that these groups concentrate on slow, discreet attacks, pass from one host to another without generating regular or predictable network traffic, and put procedures in place to ensure that their actions are not noticed by the legitimate operators of the systems. To do this, they use a whole range of tools, from the use of malicious software, through phishing specific information from particular target individuals, to social engineering techniques.

In the case of a computer network, the conventional defence measures against this type of attack involve using firewalls, intrusion prevention systems, anti-virus programs and network surveillance tools for the computer network of the entity in question. These techniques are often imperfect, to the point where the attacks carried out are not detected within 400 days of their presence on the attacked network.

A further drawback of these traditional measures is that even although they make it possible to identify individual events, they do not associate the events with one another, thus preventing global analysis of the network attacks.

A further drawback of the current measures is that they do not make it possible to process rapidly the amounts of data carried by the information networks, in particular the computer networks.

There is therefore a real need to provide a method for detecting unwanted intrusions into a network which makes it possible to process a large amount of data rapidly so as to give a global view of the network situation and rapidly detect the presence of unwanted intrusions, so as to eliminate them before they place the targeted organisation at risk.

BRIEF SUMMARY OF THE INVENTION

The invention aims to overcome at least some of the drawbacks of the processes for detecting unwanted intrusions into an information network, in particular a computer network.

In particular, the invention also aims to provide, in at least one embodiment of the invention, a process for detecting unwanted intrusions which makes it possible to process a large amount of data of any type.

The invention also aims to provide, in at least one embodiment, a process which links together the different occasions when unwanted intrusions were detected.

The invention also aims to provide, in at least one embodiment of the invention, a process which makes it possible to obtain the state of the processing underway at a time t.

The invention also aims to provide, in at least one embodiment, a process which does not require interrogation of the network which is under investigation (and is therefore potentially corrupted) to retrieve additional data.

The invention also aims to provide, in at least one embodiment, a process which provides a report which can be read by a human operator and can be made direct use of.

The invention further aims, in accordance with different aspects of the invention, to provide a corresponding device, computer program product and storage medium.

To achieve this, the invention relates to a process for detecting unwanted intrusions into an information network, comprising a step of receiving a plurality of pieces of raw data from this network, characterised in that it comprises, for each piece of raw data received:

a step of allocating at least one intrusion indicator search engine which is suitable for processing this type of raw data, a step of processing this piece of raw data, carried out in parallel by each search engine allocated to this piece of raw data, each search engine being configured to search within said piece of data for at least one intrusion indicator and to extract any new data to be analysed, known as derived data, which may be corrupted, a step of returning each piece of derived data to said allocation step as a new piece of raw data, if this piece of derived data has not already been processed by said same search engine(s) allocated to this piece of data, so as to provide recursive analysis of each piece of raw data from the network.

Throughout the following text, the terms "raw data" or "derived data" refer to a set of digital codes which can be understood directly by a machine such as a computer. In other words, this is any digital information created by a user, program or machine and carried by a computer network. Typically, it is a text document, image, audio, video, compressed document, three-dimensional visualisation document, executable programme, machine file, history file, database, URL address, URI address, IP address, domain name etc.

A process according to the invention makes it possible to analyse all of the data from the network recursively, and in particular the data encapsulated in another piece of data. A process according to the invention can therefore analyse all of the data from the network in detail, and retrieve all of the attack indicators from the network.

Further, a process according to the invention submits each piece of data to a search engine specific to the type of data, either to extract another piece of data therefrom or to retrieve an indicator that the piece of data is an unwanted piece of data and poses a threat to the security of the network.

The search engines may be of any type, such as decompression tools, decryption tools, sandbox tools which make it possible to execute software with fewer risks to the operating system, malicious software analysis tools such as antivirus software, network analysis tools etc.

The recursion of the analysis, starting from a piece of raw data, only ends when each piece of derived data provided by each search engine has already been identified by an identical search engine. This means in particular that the same search engine has already made it possible to identify the same piece of data. If the version of the search engine is different from the one used for the previous detection of the piece of derived data, the recursive loop continues. This makes it possible for example, in the case of antivirus software and data of the "file" type, to guarantee that the file has already been analysed by the most recent version of the antivirus software. If this piece of data has already been processed, but only by an old version of the antivirus software, it will be reanalysed by the most recent version available. This makes it possible for example to detect a virus in the file which was not present in the older version of the antivirus software and therefore could not be detected using the previous version of the antivirus software, even though the filed had already been discovered.

Throughout the text, complete analysis of a piece of data means passing the piece of data through at least the successive steps of allocating search engines, processing the data using the search engines, and returning the derived data to the allocation step. Unless stated otherwise, the term "processing data" corresponds to the specific steps of processing this data using the allocated search engines. However, analysing the data corresponds to the sequence of steps including the processing steps. The term "analysis" is therefore used to refer to the entire process to which the data is submitted, whilst the term "processing" is used to refer to the extraction of information by the search engines.

A process according to the invention therefore makes it possible to analyse a large amount of data automatically, whilst always ensuring that the data are processed using the most recent available versions of the search engines used.

A process according to the invention makes possible automated and rapid analysis of all of the data from the network. It therefore makes it possible to detect rapidly the present of unwanted data on the network, allowing security teams to act rapidly to put in place the necessary corrective measures.

Advantageously, a process according to the invention includes a step of communicating each intrusion indicator and each piece of derived data provided by each search engine during said processing step. Each piece of derived data and each intrusion indicator is communicated to a module, referred to in the following as the administrator module. This makes it possible for this administrator module in particular to control the detection process as it knows the result of each processing of each analysed piece of data, and can thus adapt the following steps of the analysis. This further makes it possible to link different detections of unwanted intrusions to one another.

Advantageously, a process according to the invention comprises a step of creating a report, known as an individual report, in which the results of the processing by the search engines are subsequently saved together with the identity of the allocated search engines.

This makes it possible to save the results in reports which can subsequently be used to control the detection process, either to link the different detections to one another, or to provide the state of the detection process at a time t.

Advantageously, each individual report is created by the same module to which the results of the processing are communicated, in other words the administrator module.

In this advantageous variant, an individual report is created for each piece of data analysed during the allocation step. The results of the processing by the search engines allocated to this piece of data are saved in this individual report. If a piece of derived data is identified during processing by a search engine, this piece of data may be returned by the return step to the allocation step and be treated like a new piece of raw data in the context of the recursive analysis. Also, an individual report is created by the administrator module for this piece of derived data, in which the results of the processing by the search engines allocated to this piece of derived data are saved. The mechanism of creating individual reports is continued in this way, for each initial piece of raw data, until the end of the recursive analysis for this piece of data. This therefore generates a tree of individual reports, this tree containing at each node the individual processing report for the piece of data in question. It is therefore subsequently possible, by reading the tree of individual reports, to identify the mechanism which made it possible to discover a piece of derived data and/or an unwanted intrusion indicator, and thus to understand the attack mechanism implemented by the attacker.

Each individual report created by a process in accordance with this variant, may contain a variety of information relating to the processing carried out by the search engines allocated to this piece of data and relating to the piece of data itself.

Advantageously, each individual report is created so as to contain one or more of the following pieces of information: creation date of the individual report; dates of the various processing operations carried out on the piece of data; name and version of each search engine allocated to this piece of data; name of the piece of data analysed, memory size of the piece of data analysed; hash code of the piece of data; source of the piece of data.

Advantageously, a process according to the invention comprises a step of compiling, for each piece of raw data from the network, said individual reports in a final report when the recursive analysis of this piece of raw data is ended.

The final report makes it possible to access the tree of individual reports and to know what has taken place in each step of the analysis.

Advantageously, a process according to the invention comprises a step of saving each individual report and each final report in a backup base.

This makes it possible to form a knowledge base of the different processing operations carried out by the search engines. This further makes it possible to link together the occasions when intrusions were detected at different periods, making it possible for example to determine that separate attacks are of the same origin.

Advantageously, a process according to the invention comprises a step of interrogating said backup base to determine whether a piece of derived data has already been processed by an identical search engine.

A process in accordance with this variant interrogates the backup base to determine whether the piece of derived data discovered by a search engine has already been subject to processing by the same search engine. Turning to the backup base thus makes rapid and ordered access to the set of information obtained during the previous processing operations possible.

Advantageously and in accordance with the invention, in the allocation step, each intrusion indicator search engine is selected from a predetermined plurality of search engines.

A predetermined list of search engines is provided, for example, before the process is executed, and for each type of data received the allocation step selects at least one search engine suitable for processing this piece of data.

This list of search engines can be updated when either of a new type of data or a new type of processing which can be carried out on a type of data appears.

Advantageously, a process according to the invention comprises a step of notification by a specific search engine, known as a default search engine, that said piece of data cannot be processed if said piece of data is of a type that was not recognised during the allocation step.

If the allocation step does not make it possible to associate a search engine suitable for processing the type of data received (either a piece of raw data directly from the network of which the data are being analysed, or a piece of derived data, from previous processing by another search engine), the piece of data is transmitted to a default search engine, which merely notifies that the piece of data is of an unknown type and that it cannot process it. A report is still created during the creation step and the information that the piece of data cannot be processed is saved in the report.

The invention further relates to a device for detecting unwanted intrusions into an information network, in particular a computer network, comprising a module for receiving raw data from this network, characterised in that it comprises:

a plurality of intrusion indicator search engines configured to search within at least one type of raw data for at least one attack indicator and to extract any new data to be analysed, known as derived data, which may be corrupted, a distribution module suitable for allocating, to each piece of raw data received by said receiving module, at least one search engine from said plurality of search engines which is suitable for processing this type of raw data, an administrator module, linked to the search engines and to the distribution module and configured to transmit each piece of derived data to said distribution module as new raw data if it has not already been processed by said same search engine(s), so as to provide recursive analysis of each piece of raw data received by said receiving module.

Throughout the text, "module" refers to a software element, a subset of a software program, which can be compiled separately, either for independent use or to be assembled with other modules of a program, or a hardware element, or a combination of a hardware element and a software subprogram. A hardware element of this type may comprise an application-specific integrated circuit (also known by the acronym ASIC) or a programmable logic circuit or any equivalent hardware. Generally speaking, a module is therefore an element (software and/or hardware) with which a function can be carried out.

According to the invention, a plurality of pieces of raw data is received by a receiving module from a network to be analysed. Each piece of data is subsequently analysed by the distribution module so as to allocate to this piece of raw data one or more search engines suitable for processing this type of raw data. The results of these various processing operations are subsequently transmitted to the administrator module, which determines whether or not the recursive analysis of this piece of raw data has ended. If new derived data need to be analysed, these data are transmitted to the distribution module for a reiteration of the analysis process.

The search engines may be of any type. They may comprise decompression tools, decryption tools, sandbox tools, malicious software analysis tools such as antivirus software, network analysis tools etc. They may be in the form of hardware products, software or even third-party services.

Preferably, the receiving module for data from the network to be analysed and the administrator module form a single module, in such a way that it is the administrator module which receives the data from the network which are to be analysed.

The distribution module advantageously implements the allocation step of a process according to the invention, and the allocation step of a process according to the invention is advantageously implemented by a distribution module according to the invention.

The administrator module advantageously implements the step of returning a process according to the invention, and the step of returning a process according to the invention is advantageously implemented by an administrator module according to the invention.

Advantageously and according to the invention, each search engine is configured to transmit each intrusion indicator and each piece of derived data which it has detected to said administrator module.

In this variant, it is the administrator module which receives the results of the processing operations. It therefore acts as the control and command module of the device, since on the one hand it receives the data to be analysed and on the other hand it receives the results of the processing operations by the different search engines. It is therefore able to determine whether the recursive analysis needs to be continued or whether this piece of data has been analysed extensively.

The administrator module advantageously implements the communication step of a process according to the invention, and the communication step according to the invention is advantageously implemented by an administrator module according to the invention.

Advantageously and in accordance with this variant, the administrator module is configured to create, for each piece of data transmitted to the distribution module, a processing report, known as an individual report, in which the results of the processing operations by said search engines transmitted to the administrator module are subsequently saved in combination with the identity of the allocated search engines.

In this variant, the administrator module creates an individual report for each piece of data transmitted to the distribution module.

The administrator module advantageously implements the step of creating an individual report of a process according to the invention, and the step of creating an individual report according to the invention is advantageously implemented by an administrator module according to the invention.

Advantageously, a device according to the invention comprises a module for creating a final report, for each piece of raw data from the network, compiling the individual reports, once the recursive analysis of this piece of raw data is ended.

The creation module advantageously implements the step of compiling the individual reports of a process according to the invention, and the step of compiling the individual reports according to the invention is advantageously implemented by a creation module according to the invention.

Advantageously, a device according to the invention comprises a backup base which can be accessed by said administrator module and in which each individual report and each final report are saved.

The administrator module advantageously implements the step of interrogating the backup base of a process according to the invention, and the step of interrogating the backup base according to the invention is advantageously implemented by an administrator module according to the invention.

In an advantageous variant of the invention, the backup base further comprises information on the processing of raw data from other information networks, thus acting as a knowledge base.

In this variant, the backup base comprises information originating for example from analyses of other information networks or previous analyses of the same information network. It is therefore possible to find correlations between the different analyses and to characterise the discovered attacks. Also, information from different attacks makes it possible to determine a profile of an attacker, for example by combining different but interlinked information, such as the same type of discovered corrupt file, an identical signature of an attacker etc.

Advantageously and according to the invention, the module for receiving the raw data is not linked to said information network for which the detection of targeted attacks is implemented.

Preferably, the complete analysis of the raw data from a network is carried out while completely disconnected from the network in question. This ensures that any attackers are not aware of the efforts being made against them. The idea is to remain as discreet as possible about the analysis being carried out, so as not to alert the attackers that detection is underway, and this subsequently makes it possible to better combat the attacker. This makes it possible, for example, from the moment when detection of an unwanted intrusion has been occurred, to observe what the attacker is doing, to determine what he is attempting to extract from the network, and potentially to obtain information about the attacker so as to isolate and expose him. Further, no interrogation of the computer network under investigation is carried during the analysis of the data from the network.

This being the case, in other variants the complete analysis of the data may be carried out online and/or by analysing the continuous flow of the data sent to the network.

A device according to the invention may have various architectures. This may be a distributed architecture or an autonomous, independent architecture.

In an advantageous variant, the device may comprise a plurality of distinct machines, each machine accommodating at least one module of the device, the machines being interconnected via at least one wired and/or wireless network.

The invention further relates to a computer program product which can be downloaded from a communications network and/or recorded on a medium which can be read by computer and/or executed by a processor, characterised in that it comprises program code instructions for implementing the process for detecting unwanted intrusions on a computer network according to the invention.

A computer program product of this type may for example be executed on a single machine to analyse the content of the data stored on this computer and detect any unwanted intrusions.

The invention further relates to a computer-readable storage medium, removable in whole or in part, storing a computer program comprising a set of instructions which can be executed by a computer to implement the process for detecting unwanted intrusions on an information network according to the invention.

The invention further relates to a process, a device, a computer program product and a storage device characterised in combination by some or all of the features mentioned above or in the following.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, in which.

DETAILED DESCRIPTION OF AN EMBODIMENT OF THE INVENTION

Throughout the following detailed description with reference to the drawings, unless stated otherwise, a device and a process for detecting unwanted intrusions into an information network according to the invention are disclosed using the example of an information network in the form of a computer network. A computer network of this type makes it possible to share digital data of all types, created by users, programs or machines (computers, mobile telephones, digital tablets etc.) between different users and/or machines. This may for example be a text document, image, audio, video, a compressed document, a three-dimensional visualisation document, an executable program, a machine file, a history file, a database, a URL address, a URI address, an IP address, a domain name etc.

Figure 1:
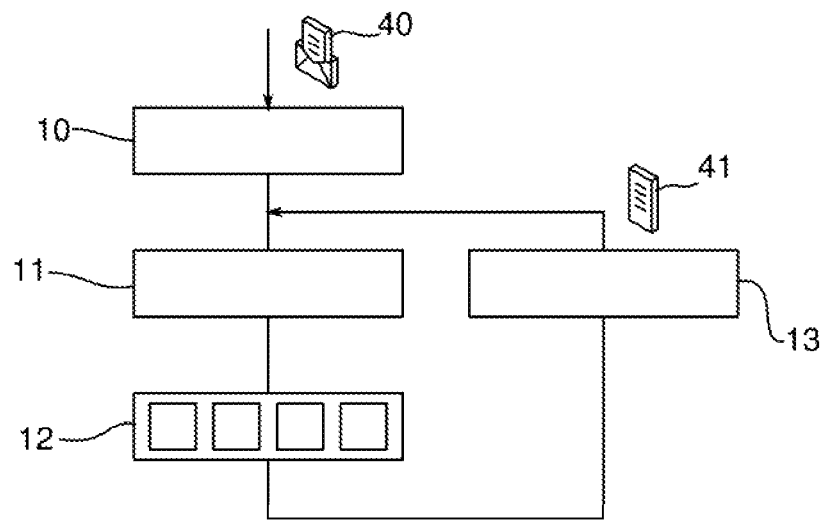
FIG. 1 is a schematic drawing in the form of steps of a process for detecting unwanted intrusions in accordance with an embodiment of the invention.

Referring to FIG. 1, a process for detecting unwanted intrusions into an information network according to the invention comprises a step 10 of receiving a plurality of raw data from this network. In FIG. 1, a piece of raw data 40 received during the receiving step is represented as being an email containing attachments.

A process according to the invention further comprises, for each piece of raw data 40, a step 11 of allocating at least one search engine 32, 33, 34, 35 for an intrusion indicator suitable for processing this type of raw data.

In the case of a piece of raw data 40 in the form of an email, the search engines 32, 33, 34, 35 are for example antivirus software suitable for detecting any viruses in the attachments of the email, decryption tools for decrypting the encrypted data attached to the email, decompression tools etc.

Generally speaking, the search engines may be of any type, such as decompression tools, decryption tools, sandboxes of malicious software analysis tools such as antivirus software, network analysis tools etc. The search engines are determined depending on the raw data to be analysed. If new data appear on the network to be analysed, new search engines may be incorporated in the invention to make it possible to process these new data. The invention is disclosed as having four distinct search engines, but needless to say the number of search engines is not limited to this number. In one embodiment of the invention, the search engines are selected from a predetermined list of search engines.

If the piece of data to be processed is of an unknown type, there is a notification from a search engine allocated to this unknown piece of data by default that the piece of data cannot be processed.

According to the invention, a process further comprises a step 12 of processing this piece of raw data 40, carried out in parallel by each search engine 32, 33, 34, 35 allocated to this piece of raw data 40.

Each search engine 32, 33, 34, 35 is configured to search in this piece of data 40 for at least one intrusion indicator and extract any pieces of derived data 41 which may be corrupted.

A process according to the invention comprises a step 13 of returning each piece of derived data 41 to the allocation step as a new piece of raw data if this piece of derived data has not already been processed by the same search engines allocated to this piece of data, so as to provide recursive analysis of each piece of raw data from the network.

The analysis is recursive and only ends when no more pieces of derived data are discovered or when the pieces of derived data identified have already been processed by identical search engines. The search engines allocated to a piece of derived data are not necessarily the same as the search engines allocated to the initial piece of raw data. This depends on the type of derived data and the type of initial raw data.

Figure 2:
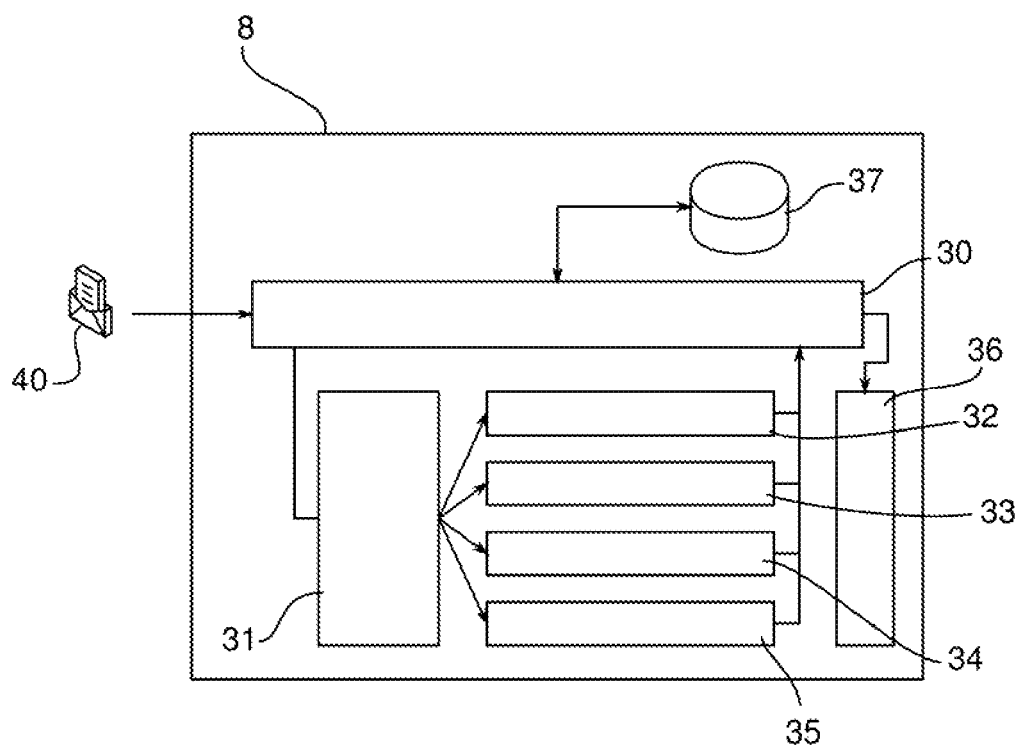
FIG. 2 is a schematic drawing of a device for detecting unwanted intrusions into an information network in accordance with an embodiment of the invention.

A process in accordance with the embodiment of FIG. 1 is advantageously implemented by a device according to FIG. 2.

A device of this type comprises an administrator module 30, a distribution module 31 and a plurality of search engines 32, 33, 34, 35.

The administrator module 30 acts as a module for receiving the data to be analysed.

The search engines 32, 33, 34, 35 are suitable for searching within at least one type of raw data for at least one attack indicator and extracting any new derived data which may corrupted for analysis.

The distribution module 31 is adapted to allocate, to each piece of raw data received by the administrator module 30, at least one search engine suitable for processing this type of raw data.

If the piece of data to be processed by the search engines is of an unknown type, a search engine known as the default search engine is allocated to this piece of data.

The administrator module 30 acts as the control and command unit of the device. It is this module which receives the data to be analysed and directs them to the distribution module. It is also this module which determines whether or not any piece of derived data discovered by a search engine needs to be analysed in turn.

In one embodiment of the invention, it further comprises a report creation module 36. This module creates the individual reports at the end of each processing operation at the instigation of the administrator module, and the final report at the end of the complete analysis of the piece of data.

The administrator module 30 saves the results of the various processing operations in a backup base 37.

Consulting this backup base makes it possible to ascertain the analysis state of the network at a time t, not only for the operators carrying out the network analysis, but also for the operators analysing other networks, the backup base 37 thus acting as a knowledge base for retrieving information about previously discovered attacks. This makes it possible in particular to link different detections to one another so as better to characterise an attacker.

In the embodiment of FIG. 2, the different modules are software elements.

In other embodiments, at least some modules may be subsets of a software program, which can be compiled separately. They may also take the form of a hardware element or a combination of a hardware element and a software subprogram.

Figure 3:
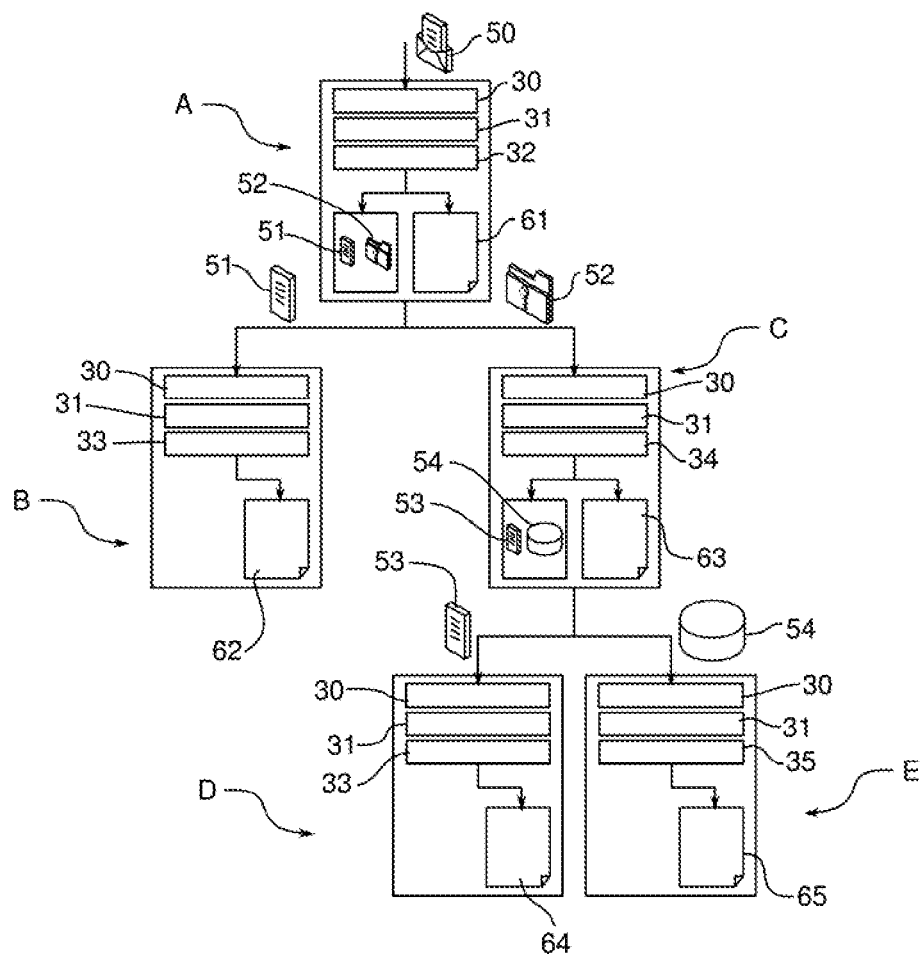
FIG. 3 is a schematic drawing of the principle of the recursive analysis implemented in a process and by a device in accordance with an embodiment of the invention.

In FIG. 3, the principle of recursive analysis is illustrated starting from a piece of raw data in the form of an email 50. For reasons of illustration and clarity, the modules used during the analysis are shown for each recursive loop. The analysis shown in FIG. 3 has a count of five cycles, denoted A, B, C, D and E respectively.

During cycle A, the email 50 is received by the administrator module 30 during the receiving step 10, and subsequently transmitted to the distribution module 31 during the allocation step 11, which redirects it to a search engine 32 suitable for processing an email during the processing step 12. The processing step 12 identifies two pieces of derived data, a text file 51 and a compressed file 52 in the form of a zip file respectively. These two pieces of derived data are each returned, during the return step 13, to the administrator module 30 to undergo a new analysis cycle.

During analysis cycle B, the text file 51 is examined by the administrator module 30 and subsequently transmitted to the distribution module 31. During the recursive allocation step 11, the distribution module 31 allocates the search engine 33 suitable for processing text files to this text file 51. In the embodiment shown in FIG. 3, the search engine 33 does not discover a new piece of derived data during the processing step 12. However, this search engine may have detected an attack indicator, for example if the file contains a virus and if the search engine 33 is antivirus software. If no new pieces of derived data have been discovered by the search engine 33 and this search engine 33 is identical to the search engine used previously to analyse a text file, the recursive loop for this text file is ended.

During analysis cycle C, the compressed file 52 is examined by the administrator module 30 and subsequently transmitted to the distribution module 31. During the recursive allocation step 11, the distribution module 31 allocates the search engine 34 suitable for processing compressed files to this compressed file 52. This processing step 12 by the search engine 34 identifies two new pieces of derived data, a text file 53 and a database 54 respectively. These two new pieces of data are therefore returned in turn to the administrator module 30 during a recursive return step.

During analysis cycle D, the text file 53 is examined by the administrator module 30 and subsequently transmitted to the distribution module 31. During the recursive allocation step 11, the distribution module 31 allocates the search engine 33 suitable for processing text files to this text file 53. In the embodiment of FIG. 3, this is the same search engine which was used during cycle B, since this is a text file of the same type. In the embodiment shown in FIG. 3, the search engine 33 does not discover any new piece of derived data during the processing step 12. If no new piece of derived data has been discovered by the search engine 33 and the search engine 33 is identical to the search engine used previously to analyse a text file, the recursive loop for this text file is ended.

Finally, during analysis cycle E, the database 54 is examined by the administrator module 30 and subsequently transmitted to the distribution module 31. During the recursive allocation step 11, the distribution module 31 allocates the search engine 35 suitable for processing databases to this database 54. If no new piece of derived data has been discovered by the search engine 35 and this search engine 35 is identical to the search engine used previously to analyse a file of the same type, the recursive loop for this piece of data is ended.

In this way, the piece of raw data 50 is fully analysed by the successive cycles A, B, C, D and E, which have made it possible to highlight the pieces of derived data 51, 52, 53, 54 and any attack indicators during the processing operations by the different search engines. As stated above, these attack indicators are for example virus detection events by antivirus software.

In an advantageous embodiment of the invention, individual reports are created to contain the results of the processing operations by the search engines and the identity of the search engines allocated to this piece of data.

In FIG. 3, a report 61 is created to contain the analysis results of the email 50 which were obtained during the initial analysis cycle A of the email 50. The text file 51, derived from the email 50 subsequently passes through the successive receiving, allocation and processing steps. The results of this analysis loop B are saved in a report 62. The compressed file 52, derived from the email 50, also passes through the successive receiving, allocation and processing steps. The results of this analysis loop C are saved in a report 63. Since these analyses have identified two new pieces of derived data, the text file 53 and the database 54 respectively, each of these new pieces of data passes through the analysis loop. The results of the analysis loop D of the text file 53 are saved in a report 64 and the results of the analysis loop E of the database are saved in a report 65.

Figure 4:
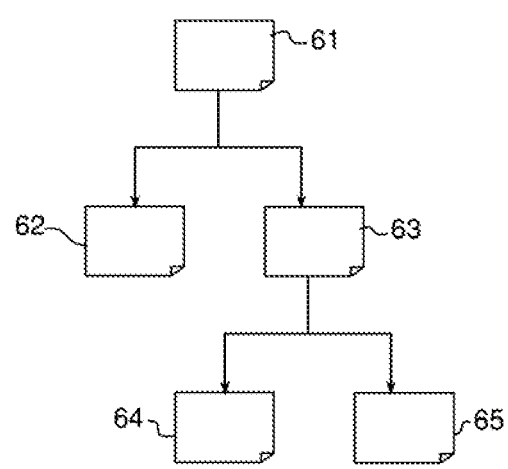
FIG. 4 is a schematic drawing of the sequence of steps for creating individual reports implemented by a device and in a detection process in accordance with an embodiment of the invention.

This makes it possible to generate a tree of reports, as shown in FIG. 4.

When the complete analysis of the piece of data is ended, in an advantageous variant of the invention, a final report compiling all of the individual reports is created during a compilation step 25. Each individual report and the final report are preferably saved in a backup base 37.

Figure 5:
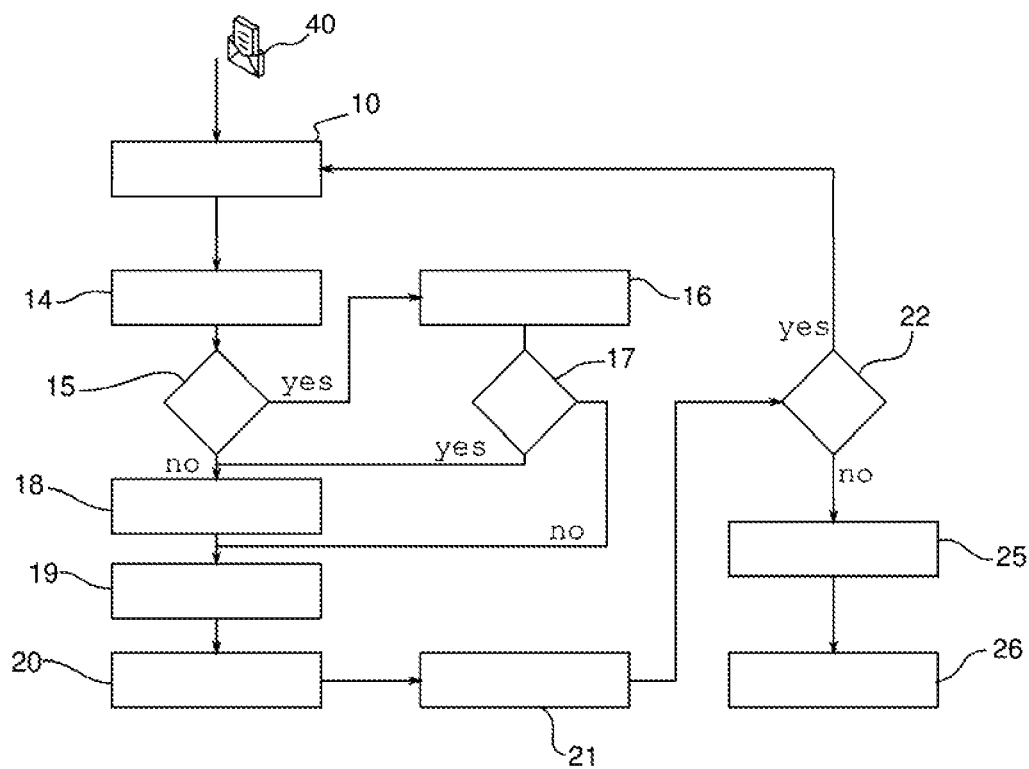
FIG. 5 is a schematic drawing in the form of steps of a process in accordance with an embodiment of the invention implemented by an administrator module of a device in accordance with an embodiment of the invention.

FIG. 5 shows the different steps implemented in an administrator module 30 in a preferred embodiment of the invention.

In step 10, a piece of data 40 to be analysed is received. An individual report 60 is created in the step 14 of creating an individual report. This individual report 60 is subsequently added to, but is created when the piece of data 40 to be analysed is received, so as to indicate therein for example the time of receipt and the origin of the piece of data.

In the following step 15, the administrator module 30 determines whether the piece of data 40 is known. To achieve this, the administrator module 30 consults the backup base 37.

If the piece of data 40 is known, during a step 16 the administrator module 30 extracts the reports created during the previous analysis of this piece of data 40 from the backup base 37, so as to list the different search engines used previously to process this piece of data 40. If the search engines have been updated, the piece of data 40 is sent to the distribution module 31 for processing. If the search engines have not been updated, the piece of data 40 will not be reprocessed, and the process continues directly to the step 19 of interrogating the backup base 37 to retrieve the results supplied by the search engines.

If the piece of data 40 is unknown, it is sent to the distribution module 31 during a step 18 of transmitting the piece of data to the distribution module 31.

During a step 19, the results of the processing operations by the different search engines are retrieved by the administrator module 30.

The individual report 60 is updated during a step 20.

This report 60 is saved in the backup base 37 during a saving step 21.

In step 22, the administrator module 30 determines whether a piece of derived data has been identified. If a piece of derived data has been identified, it is then returned to the receiving step 10 for recursive analysis of this piece of derived data. In the embodiment of FIG. 5, the end of the recursive analysis is determined by two separate tests in succession. On the one hand, there is the determination in step 22 of the presence of a new piece of data, and on the other hand, there is the determination of a possible new search engine in step 17. In other embodiments, these steps are simultaneous.

If no new piece of data is identified by the search engines, a final report is created in the step 25 of compiling individual reports.

In step 26, the backup base 27 is updated.

A device according to the invention may be physically linked to the computer network of which it analyses the data or unconnected thereto. To achieve this, the receiving module 10 receives the data either directly from the analysed network or via a database previously stored on an archive medium.

Figure 6:
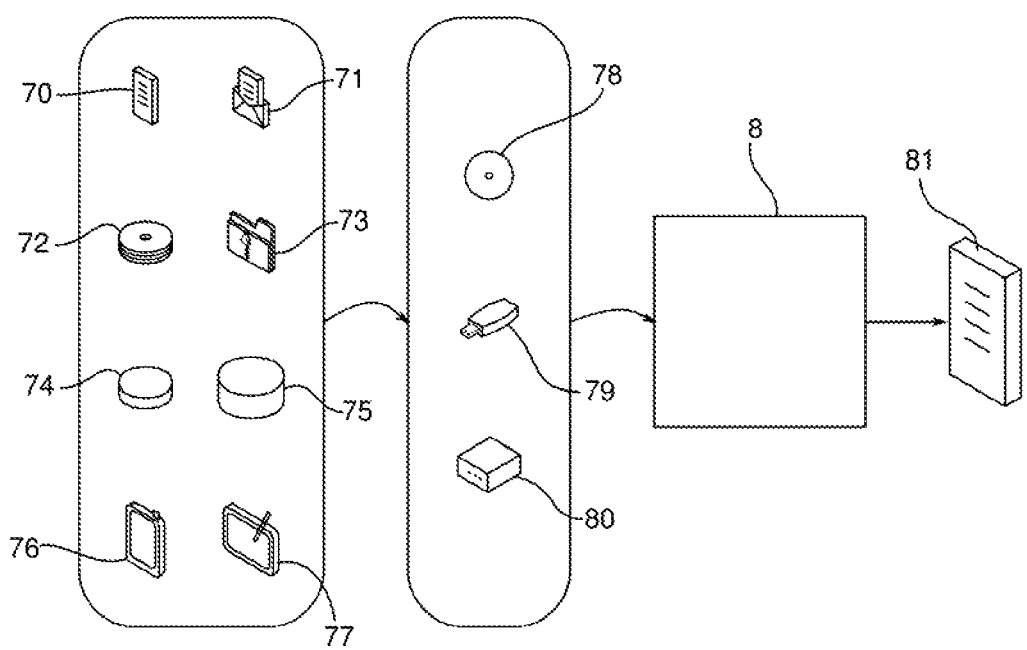
FIG. 6 is a schematic drawing of a device for detecting unwanted intrusions in accordance with an embodiment of the invention in which the data are processed while disconnected from the analysed network.

FIG. 6 shows an example of a device unconnected to the analysed network. A set of data of various types from the network is stored on archive media. In the drawing, by way of purely non-limiting example, the data are shown as possibly being text files 70, emails 71, system files 72, compressed archives 73, databases 74, directory files 75, files from mobile telephones 76 and files from digital tablets 77. Clearly, any other type of file may be taken into account by a device according to the invention.

All of these data to be analysed are subsequently stored on archive media such as an optical disc 78, a USB stick 79 or an external hard drive 80. Naturally, other types of media may be considered.

The device 8 for detecting unwanted intrusions analyses all of the data stored on the storage media. In other words, the receiving module of a device according to the invention is supplied with the data from one or other of these archive media to establish a final analysis report 81 for this set of data.

In other embodiments, the analysis may be carried out online.

Irrespective of the type of analysis carried out (online or disconnected from the network), the analysis may be local or be distributed between different sites.

Figure 7:
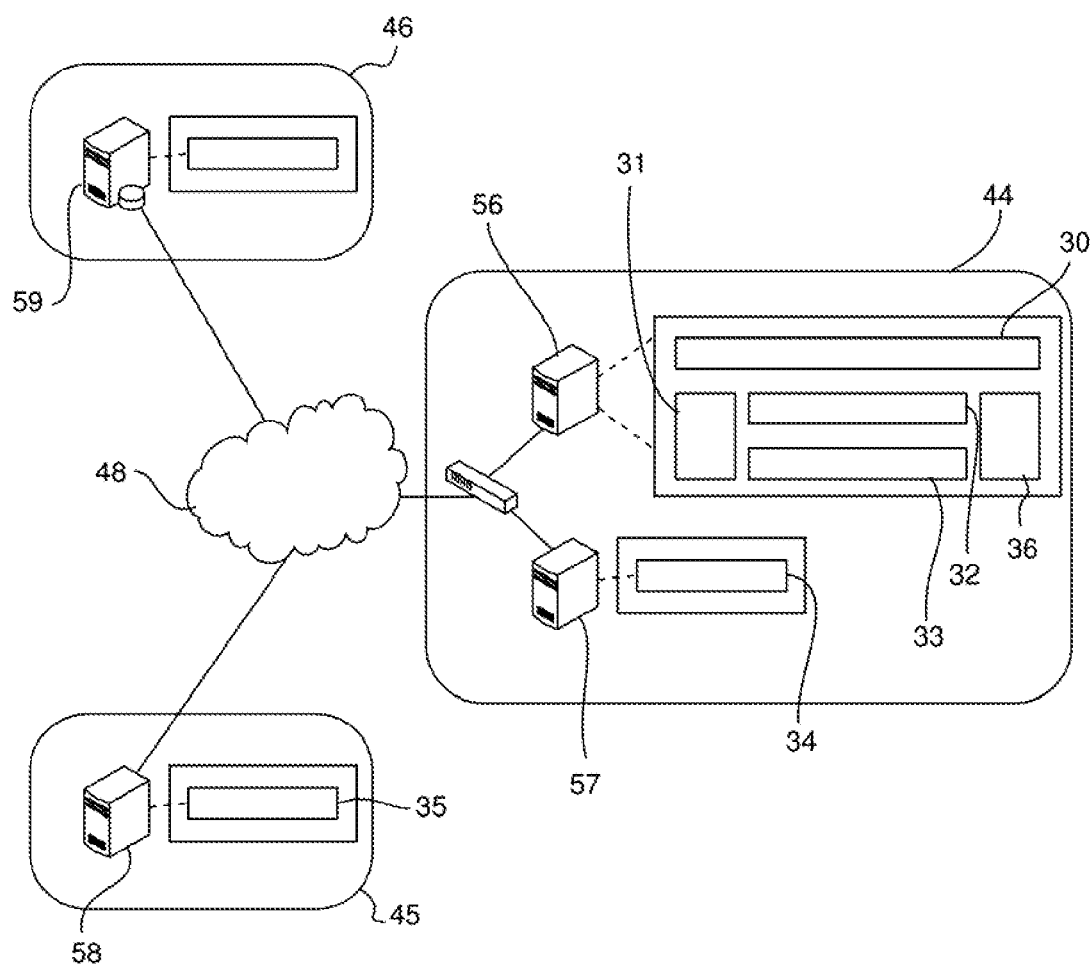
FIG. 7 is a schematic drawing of a device for detecting unwanted intrusions in accordance with an embodiment of the invention, in which search engines for an intrusion indicator are distributed over different processing sites.

For example, in the embodiment of FIG. 7, the analysis is distributed between three locations. In this embodiment, the administrator module 30 is located on a first machine 56 at a first site 44. This first machine 56 at the first site 44 further hosts the distribution module 31, the report creation module 36 and two search engines 32, 33. On the same site 44, a second machine 57 hosts a third search engine 34.

In the embodiment of FIG. 7, a third search engine 35 is hosted by a machine 58 at a second site 45.

In the embodiment of FIG. 7, a third site 56 hosts the backup base 37 on a machine 57.

All of the sites are linked by a network such as the Internet 48.

In other embodiments, the sites 44, 45, 46 are linked by a wireless network.

A process according to the invention may be implemented in the form of a sequence of instructions of a computer program. The process may equally be implemented in hardware form or in a mixed hardware and software form. If the invention is implemented in part or in whole in software form, the corresponding sequence of instructions may be stored on a removable storage medium, such as a diskette, a CD-ROM, a DVD-ROM, a USB stick etc., or a non-removable storage medium, these different media being readable in part or in whole by a computer or by a microprocessor.

The invention is not limited merely to the disclosed embodiments. In particular, in other embodiments, the information network is a PMR network or any other type of network which carries information and to which malicious data could be introduced.

We claim:

1. A method for detecting unwanted intrusions into an information network, the method comprising:
   receiving a multiplicity of pieces of raw data from the information network; and,
   for each piece of raw data received:
   allocating at least one intrusion indicator search engine which is suitable for processing a type of raw data corresponding to the raw data,
   processing the piece of raw data, carried out in parallel by each intrusion indicator search engine allocated to the piece of raw data, each intrusion indicator search engine being configured to search within said piece of raw data for at least one intrusion indicator and to extract derived data comprising new data to be analysed which may be corrupted, and
   returning each piece of derived data as a new piece of raw data to each intrusion indicator search engine not having already processed the derived data, so as to provide recursive analysis of each piece of raw data from the information network.

2. The process according to claim 1, further comprising communicating each intrusion indicator and each piece of derived data supplied by each intrusion indicator search engine during said processing.

3. The process according to claim 1, further comprising creating an individual report in which results of the processing by the allocated ones of the intrusion indicator search engines are subsequently saved along with an identity of the allocated ones of the intrusion indicator search engines.

4. The process according to claim 3, further comprising compiling, for each piece of raw data received from the information network, said individual reports in a final report when the recursive analysis of the piece of raw data has ended.

5. The process according to claim 3, further comprising saving each individual report and each final report in a backup database.

6. The process according to claim 5, further comprising interrogating said backup database to determine whether a piece of derived data has already been processed by an identical one of the intrusion indicator search engines.

7. The process according to claim 1, wherein during said allocation, each intrusion indicator search engine is selected from a predetermined plurality of intrusion indicator search engines.

8. The process according to claim 7, further comprising providing a notification by a default one of the intrusion indicator search engines that said piece of data cannot be processed if said piece of data is of an unknown type.

9. A computer program product recorded on a storage medium comprising a device which can be read by computer and/or executed by a processor, the program product comprising program code instructions for performing a method of detecting targeted attacks on an information network, the method comprising:
   receiving a multiplicity of pieces of raw data from the information network; and,
   for each piece of raw data received:
   allocating at least one intrusion indicator search engine which is suitable for processing a type of raw data corresponding to the raw data,
   processing the piece of raw data, carried out in parallel by each intrusion indicator search engine allocated to the piece of raw data, each intrusion indicator search engine being configured to search within said piece of raw data for at least one intrusion indicator and to extract derived data comprising new data to be analysed which may be corrupted, and
   returning each piece of derived data as a new piece of raw data to each intrusion indicator search engine not having already processed the derived data, so as to provide recursive analysis of each piece of raw data from the information network.

\* \* \* \* \*